US012569084B2

(12) United States Patent
Leach et al.

(10) Patent No.: US 12,569,084 B2
(45) Date of Patent: Mar. 10, 2026

(54) COLD BREWER

(71) Applicant: Toddy, LLC, Loveland, CO (US)

(72) Inventors: Julia Leach, Denver, CO (US); Clint Kolda, Loveland, CO (US); Matthew Irish, Wellington, CO (US)

(73) Assignee: TODDY, LLC., Loveland, CO (US)

( * ) Notice: Subject to any disclaimer, the term of this patent is extended or adjusted under 35 U.S.C. 154(b) by 904 days.

(21) Appl. No.: 17/806,458

(22) Filed: Jun. 10, 2022

(65) Prior Publication Data

US 2022/0395129 A1     Dec. 15, 2022

Related U.S. Application Data

(60) Provisional application No. 63/209,384, filed on Jun. 10, 2021.

(51) Int. Cl.
*A47J 31/16* (2006.01)
*A47J 31/06* (2006.01)
*A47J 31/44* (2006.01)

(52) U.S. Cl.
CPC .............. *A47J 31/16* (2013.01); *A47J 31/06* (2013.01); *A47J 31/4407* (2013.01)

(58) Field of Classification Search
CPC ........ A47J 31/16; A47J 31/06; A47J 31/4407; A47J 31/02; A47J 31/20; A47J 31/0636;
(Continued)

(56) References Cited

U.S. PATENT DOCUMENTS 6,374,726 B1 * 4/2002 Melton .................. A47G 19/16
99/275
2012/0225175 A1 * 9/2012 Lown ......................... A23F 3/18
426/435
(Continued)

FOREIGN PATENT DOCUMENTS

DE        202013010331 U1 * 3/2014   .............. A47J 31/20

OTHER PUBLICATIONS

"Cold Brew Coffee & Tea Pitcher". Hamilton Beach. Web. Aug. 14, 2020. <https://web.archive.org/web/20200814001042/https:/hamiltonbeach.com/cold-brew-coffee-and-tea-pitcher-40405r> (Year: 2020).*
(Continued)

*Primary Examiner* — Steven W Crabb
*Assistant Examiner* — Allison E Helferty
(74) *Attorney, Agent, or Firm* — Intelink Law Group, PC; Francisco A. Rubio-Campos

(57)        ABSTRACT
A cold brewer having a pitcher and lid for brewing a brewed effluent from a filter bag containing an organic material is disclosed. The pitcher has a pitcher top and bottom. The pitcher has a pitcher cavity for receiving the filter bag and the lid covers the pitcher top. The lid includes an outside portion, an inside portion, a rim that extends radially from a center of the lid, and a cylindrical sleeve. The cylindrical sleeve extends outward from the inside portion of the lid and defines a lid cavity that receives the filter bag when the filter bag is removed from the pitcher cavity and the outside portion is overturned and placed on the pitcher top. The lid includes drain holes that pass through the outside portion to the inside portion of the lid to drain the brewed effluent from the filter bag into the pitcher cavity when the filter bag is in a resting position within the lid cavity.

18 Claims, 18 Drawing Sheets

(58) Field of Classification Search
CPC .. A47J 31/4403; A47J 31/005; A47J 31/0615;
B65D 85/816; B65D 47/0842; B65D
47/0847; A47G 19/16; A47G 19/14
See application file for complete search history.

(56) References Cited

U.S. PATENT DOCUMENTS

| | | | |
|---|---|---|---|
| 2017/0055758 A1* | 3/2017 | Roth ....................... | C02F 1/003 |
| 2017/0202400 A1* | 7/2017 | Choltco-Devlin .... | A47J 19/023 |
| 2021/0212500 A1* | 7/2021 | Samartgis .............. | B65D 45/18 |

OTHER PUBLICATIONS

PCT Search Report, PCT Appln PCT/US22/72891, Jun. 10, 2022,
10 pages.

* cited by examiner

COLD BREWER
100

SPOUT
122

DRAIN
HOLES
118

LID
104

RIM
116

PITCHER
OPENING
112

PITCHER TOP
106

HANDLE
124

LID
HANDLE
120

OUTSIDE
PORTION OF LID
114

PITCHER
102

CYLINDER WALL
110

PITCHER BOTTOM
108

COLD BREWER
100

DRAIN HOLES
118

LID
104

LID HANDLE
120

RIM
116

PITCHER TOP
106

OUTSIDE
PORTION OF LID
114

PITCHER OPENING
112

SPOUT
122

PITCHER
102

250
MILLIMETERS

CYLINDER WALL
110

PITCHER BOTTOM
108

COLD BREWER
100

DRAIN
HOLES
118

OUTSIDE
PORTION OF LID
114

LID
HANDLE
120

LID
104

RIM
116

SPOUT
122

HANDLE
124

PITCHER OPENING
112

PITCHER
102

CYLINDER WALL
110

PITCHER BOTTOM
108

LID
104

CENTER OF LID
205

DIAMETER
212

LID SIDES
218

DRAIN
HOLES
118

LID
HANDLE
120

OUTSIDE
PORTION OF LID
114

CYLINDRICAL
SLEEVE
202

RIM
116

PITCHER
102

PITCHER
CAVITY
300

PITCHER INSIDE
WALL
302

SPOUT
122

HANDLE
124

BOTTOM INSIDE
SURFACE
304

CYLINDER WALL
110

500
COLD
BREWER

LID CAVITY 502

INSIDE PORTION OF LID 504

FILTER BAG 400

OPENING 518

RIM 514

516 CYLINDRICAL SLEEVE

PITCHER TOP 508

532 SPOUT

HANDLE 530

506 LID

PITCHER CAVITY 524

PITCHER 510

512 OUTSIDE PORTION OF LID

528 PITCHER INSIDE WALL

522 CYLINDRICAL WALL

526 BOTTOM INSIDE SURFACE

520 PITCHER BOTTOM

LID
HANDLE
614

600
COLD
BREWER

OUTSIDE
PORTION
OF LID
606

630
SPOUT

LID
602

RIM
610

608
INSIDE PORTION
OF LID

PITCHER
TOP
616

612
CYLINDRICAL
SLEEVE

PITCHER
CAVITY
626

604
PITCHER

HANDLE
628

622
PITCHER
INSIDE WALL

620
CYLINDRICAL WALL

624
BOTTOM INSIDE
SURFACE

618
PITCHER
BOTTOM

COLD
BREWER
600

PITCHER TOP
616

SPOUT
630

OUTSIDE
PORTION
OF LID
606

LID HANDLE
614

RIM
610

LID
602

HANDLE
628

642
DIAMETER

APEX
SURFACE
634

LID
CAVITY
638

INSIDE
SURFACE
636

INSIDE
PORTION
OF LID
608

600
COLD
BREWER

DRAIN HOLE
632

RIM
610

SPOUT
630

606
OUTSIDE
PORTION
OF LID

622
PITCHER
INSIDE WALL

626
PITCHER
CAVITY

624
BOTTOM
INSIDE
SURFACE

618
PITCHER
BOTTOM

CYLINDRICAL
SLEEVE
612

LID
602

616
PITCHER
TOP

628
HANDLE

604
PITCHER

620
CYLINDRICAL WALL

640
LOCKING
MECHANISM

614
LID HANDLE

COLD BREWER

CROSS-REFERENCE TO RELATED APPLICATIONS

The application claims priority under 35 U.S.C. § 119(e) to U.S. Provisional Patent Application No. 63/209,384, titled "COLD BREWER WITH STORAGE AND SERVING VESSEL," filed on Jun. 10, 2021, which is herein incorporated by reference in its entirety.

BACKGROUND

1. Field

The present disclosure is related to systems and methods for brewing coffee or tea, in particular, to systems and method for cold brewing coffee or tea.

2. Related Art

Cold brewing of coffee, tea and other water-soluble organic materials has been a popular procedure. Good tasting drinks are created in this manner.

SUMMARY

Disclosed is a cold brewer for brewing a brewed effluent from a filter bag containing an organic material. The cold brewer comprises a pitcher and a lid. The pitcher has a pitcher top and a pitcher bottom. The pitcher is cylindrical having a cylindrical wall and an opening at the pitcher top that defines a pitcher cavity within the pitcher; the pitcher cavity is defined by a pitcher inside wall of the cylindrical wall and a bottom inside surface of the pitcher bottom; and the pitcher cavity configured to receive the filter bag containing the organic material. The lid is configured to cover the pitcher top. The lid includes an outside portion, an inside portion, a rim that extends radially from a center of the lid, and a cylindrical sleeve. The cylindrical sleeve extends outward from the inside portion of the lid and with an inside surface of the inside portion defines a lid cavity within the inside portion of the lid. The lid cavity is configured to receive the filter bag within the lid cavity when the filter bag is removed from the pitcher cavity and the outside portion is overturned and placed on the pitcher top. The lid further includes one or more drain holes that pass through the outside portion to the inside portion of the lid. The cylindrical sleeve and the outside portion of the lid are each configured to slide into the pitcher cavity through the opening at the pitcher top until the rim sits on an edge of the pitcher top and the drain holes are configured to drain the brewed effluent from the filter bag into the pitcher cavity when the filter bag is in a resting position within the lid cavity.

Also disclosed is a method for cold brewing the organic material in the cold brewer. The method includes filling the filter bag with the organic material, inserting the filter bag within the pitcher cavity of the pitcher, and inserting water within the pitcher cavity, where inserting the water includes inserting a quantity of water into the pitcher cavity that covers the filter bag. The method then includes placing the lid on the top of the pitcher, where the lid includes the outside portion, inside portion, rim that extends radially from the center of the lid, and the rim sits on the edge of the pitcher top, and cold brewing the brewed effluent from the organic material within the filter bag. Once brewed, the method includes removing the lid from the top of the pitcher, removing the filter bag from the pitcher cavity, overturning and placing the outside portion of the lid on the top of the pitcher, and placing the filter bag within the lid cavity. The method then includes draining the brewed effluent from the filter bag into the pitcher cavity through the one or more drain holes.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A cold brewer for brewing a brewed effluent from a filter bag containing an organic material is disclosed. The cold brewer comprises a pitcher and a lid. The pitcher has a pitcher top and a pitcher bottom. The pitcher is cylindrical having a cylindrical wall and an opening at the pitcher top that defines a pitcher cavity within the pitcher; the pitcher cavity is defined by a pitcher inside wall of the cylindrical wall and a bottom inside surface of the pitcher bottom; and the pitcher cavity configured to receive the filter bag containing the organic material. The lid is configured to cover the pitcher top. The lid includes an outside portion, an inside portion, a rim that extends radially from a center of the lid, and a cylindrical sleeve. The cylindrical sleeve extends outward from the inside portion of the lid and with an inside surface of the inside portion defines a lid cavity within the inside portion of the lid. The lid cavity is configured to receive the filter bag within the lid cavity when the filter bag is removed from the pitcher cavity and the outside portion is overturned and placed on the pitcher top. The lid further includes one or more drain holes that pass through the outside portion to the inside portion of the lid. The cylindrical sleeve and the outside portion of the lid are each configured to slide into the pitcher cavity through the opening at the pitcher top until the rim sits on an edge of the pitcher top and the drain holes are configured to drain the brewed effluent from the filter bag into the pitcher cavity when the filter bag is in a resting position within the lid cavity.

Also disclosed is a method for cold brewing the organic material in the cold brewer. The method includes filling the filter bag with the organic material, inserting the filter bag within the pitcher cavity of the pitcher, and inserting water within the pitcher cavity, where inserting the water includes inserting a quantity of water into the pitcher cavity that covers the filter bag. The method then includes placing the lid on the top of the pitcher, where the lid includes the outside portion, inside portion, rim that extends radially from the center of the lid, and the rim sits on the edge of the pitcher top, and cold brewing the brewed effluent from the organic material within the filter bag. Once brewed, the method includes removing the lid from the top of the pitcher, removing the filter bag from the pitcher cavity, overturning and placing the outside portion of the lid on the top of the pitcher, and placing the filter bag within the lid cavity. The method then includes draining the brewed effluent from the filter bag into the pitcher cavity through the one or more drain holes.

Figure 1A:
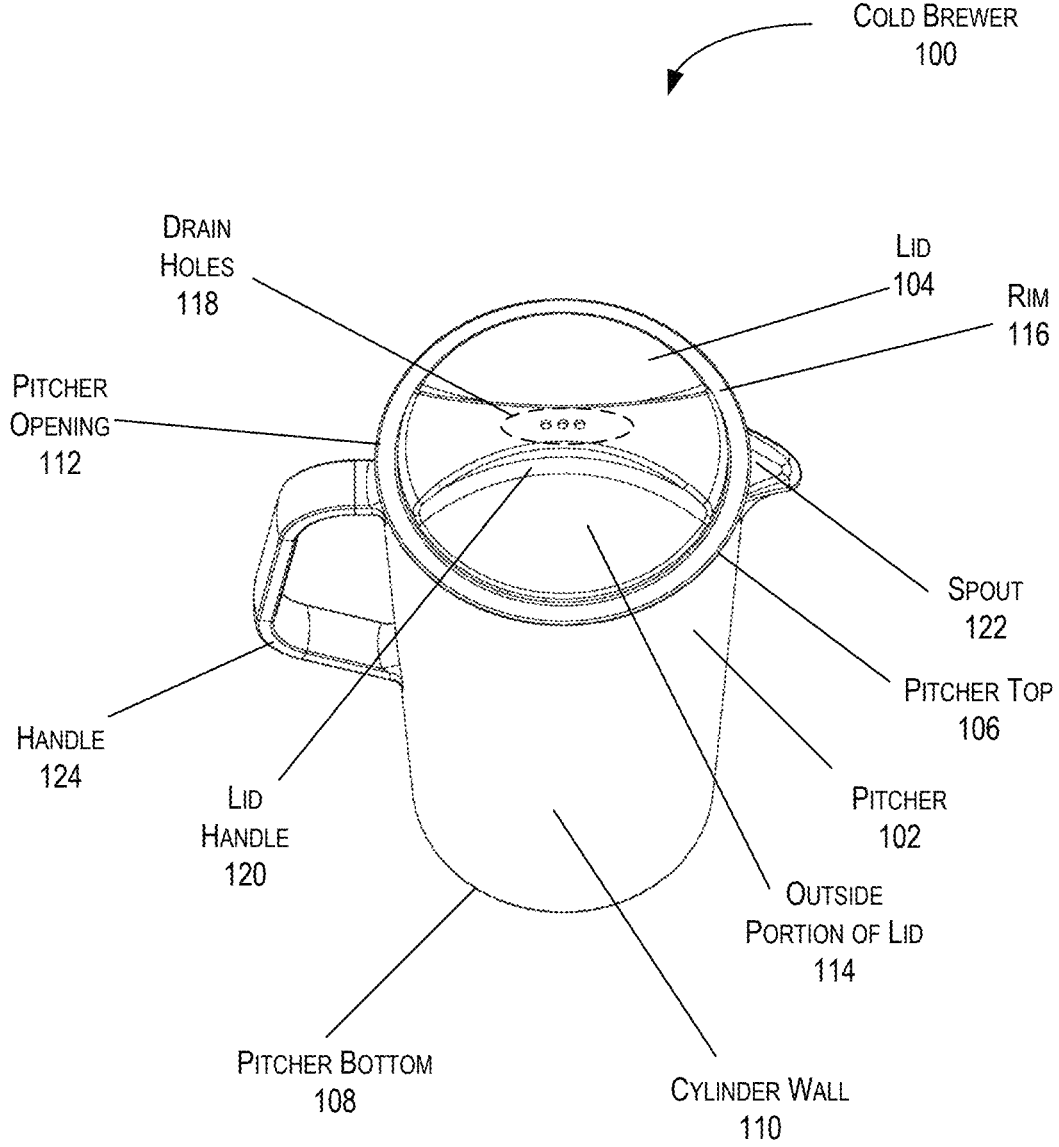
FIG. 1A is a first isometric top view of an example of an implementation of a cold brewer in accordance with the present disclosure.

FIGS. 1A through 1F show different views for an example of an implementation of a cold brewer 100 in accordance with the present disclosure. Specifically, FIG. 1A is an isometric top view of an example of an implementation of the cold brewer 100 in accordance with the present disclosure. In this example, the cold brewer 100 includes a pitcher 102 and lid 104. The pitcher 102 includes a pitcher top 106, pitcher bottom 108, and a pitcher cavity 300 (not shown in this view). In this example, the pitcher 102 is cylindrical having a cylindrical wall 110 and an opening (i.e., pitcher opening 112) at the pitcher top 106 that defines the pitcher cavity 300 within the pitcher 102. The pitcher cavity 300 is defined by a pitcher inside wall 302 (not shown in this view) of the cylindrical wall 110 and a bottom inside surface 304 (not shown in this view) of the pitcher bottom 108 and the pitcher cavity 300 is configured to receive the filter bag 400 containing the organic material.

In this example, the lid 104 includes an outside portion 114, inside portion 200 (not shown in this view), a rim 116 that extends radially from a center 205 of the lid 104, and a one or more drain holes 118. The one or more drain holes 118 pass through the inside portion 200 (not shown in this view) and outside portion 114 of the lid 104. In this example, the lid 104 also includes a lid handle 120 on the outside portion 114 of the lid 104 and the pitcher 102 also includes a spout 122 and a handle 124. The lid handle 120 may be a hand-type grip to twist and remove the lid 104 from the pitcher top 106. In this example, the lid 104 may also include a cylindrical sleeve 202 (not shown in this view) that extends outward from the inside portion 200 of the lid 104 and with an inside surface 206 of the inside portion 200 defines a lid cavity 208 within the inside portion 200 of the lid 104, where the lid cavity 208 is configured to receive the filter bag 400 within the lid cavity 208 when the filter bag 400 is removed from the pitcher cavity 300 and the outside portion 114 of the lid 104 is overturned and placed on the pitcher top 106.

In this example, the cylindrical sleeve 202 and the outside portion 114 of the lid 104 are each configured to slide into the pitcher cavity 300 through the pitcher opening 112 at the pitcher top 106 until the rim 116 sits on an edge 306 (not shown in this view) of the pitcher top 106. The one or more drain holes 118 are configured to drain the brewed effluent from the filter bag 400 into the pitcher cavity 300 when the filter bag 400 is in a resting position within the lid cavity 208.

Figure 1B:
FIG. 1B is a second isometric top view of the cold brewer shown in FIG. 1A in accordance with the present disclosure.
Figure 1B:
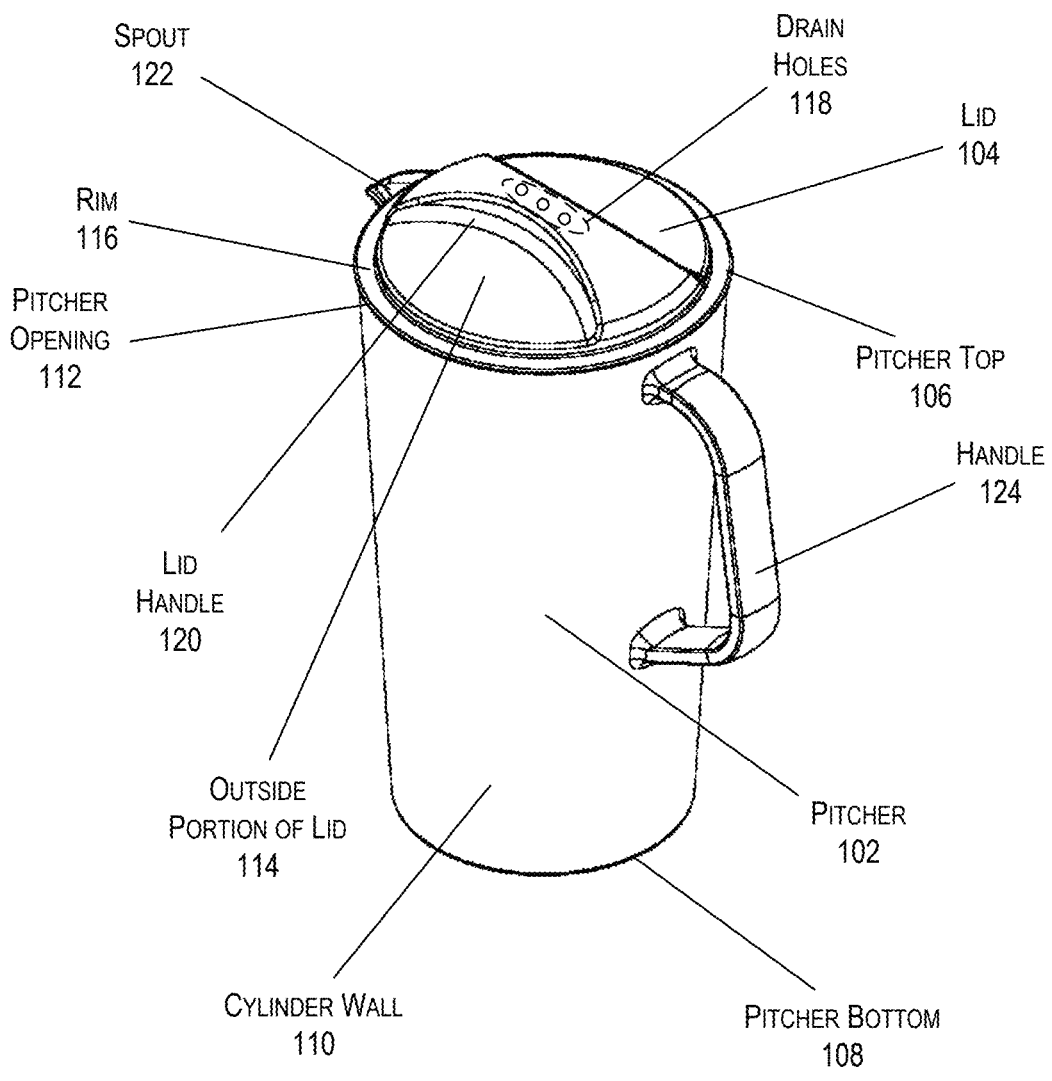
Figure 1C:
FIG. 1C is a top view of the cold brewer shown in FIGS. 1A and 1B in accordance with the present disclosure.
Figure 1C:
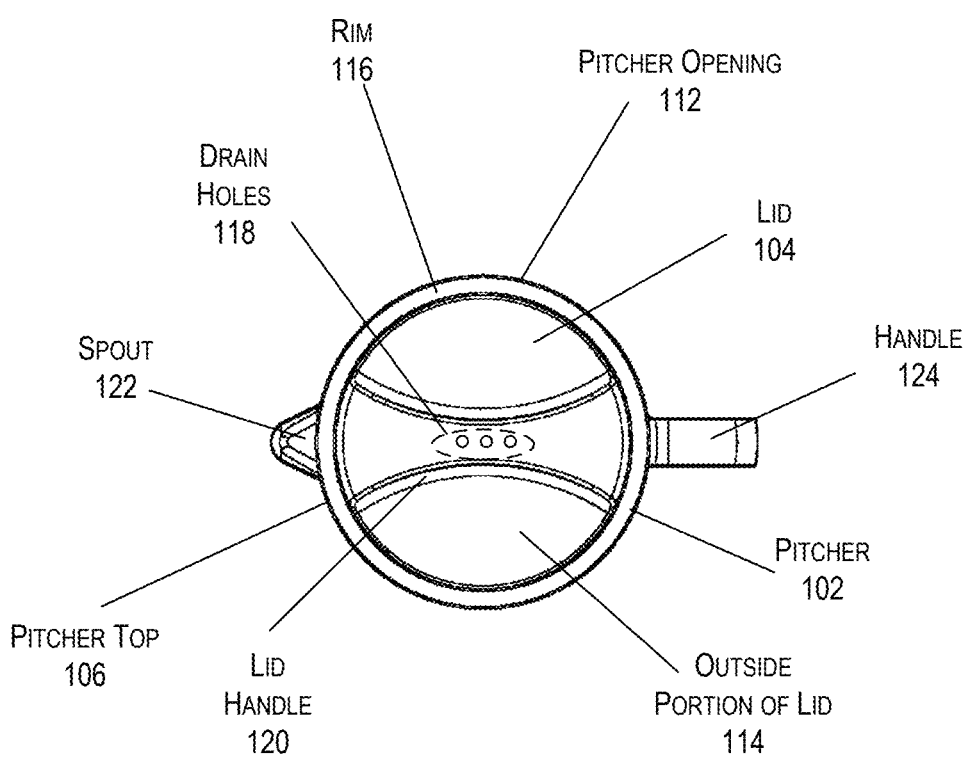
Figure 1D:
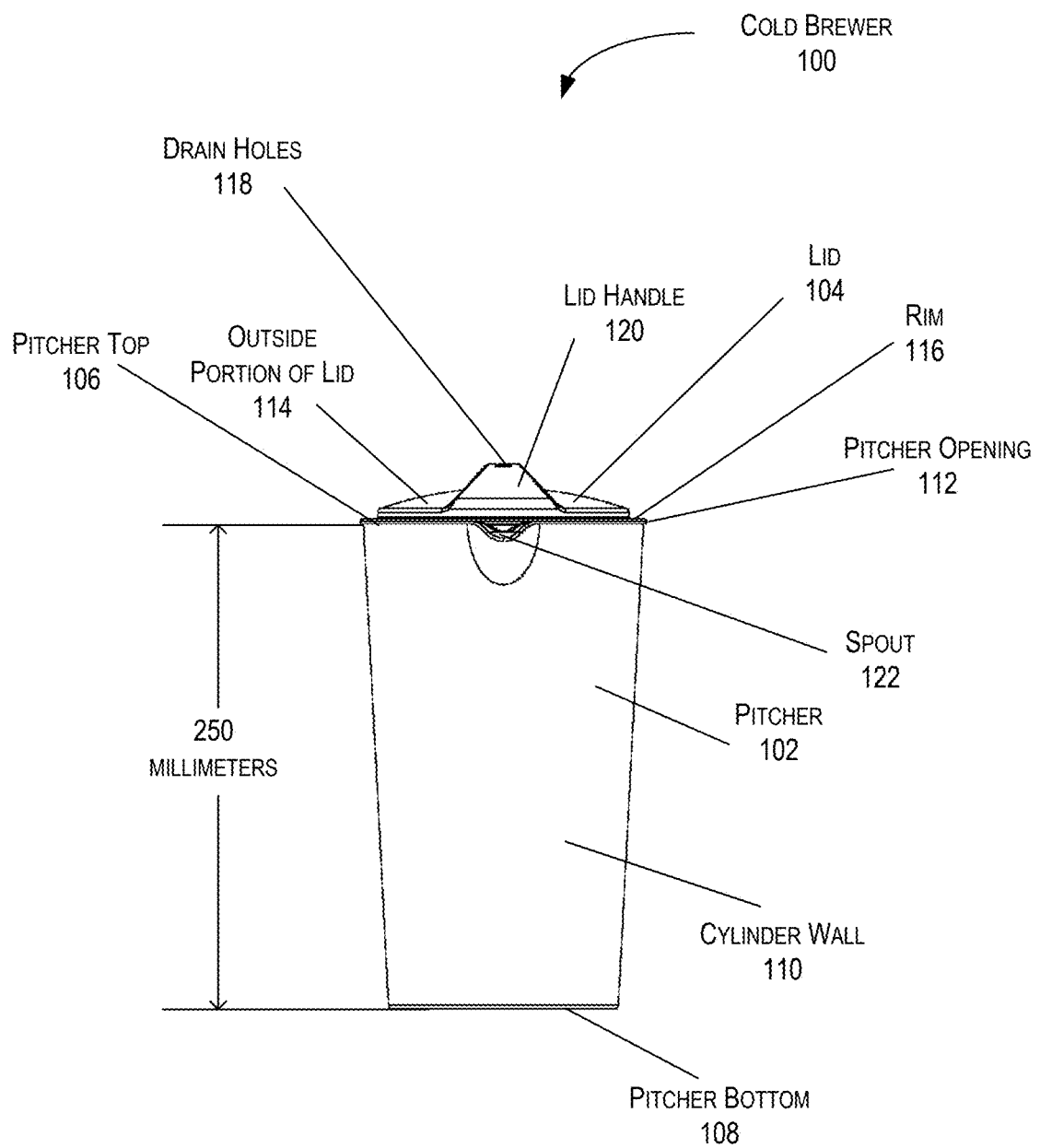
FIG. 1D is a front view of the cold brewer shown in FIGS. 1A through 1C in accordance with the present disclosure.
Figure 1E:
FIG. 1E is a back view of the cold brewer shown in FIGS. 1A through 1D in accordance with the present disclosure.
Figure 1E:
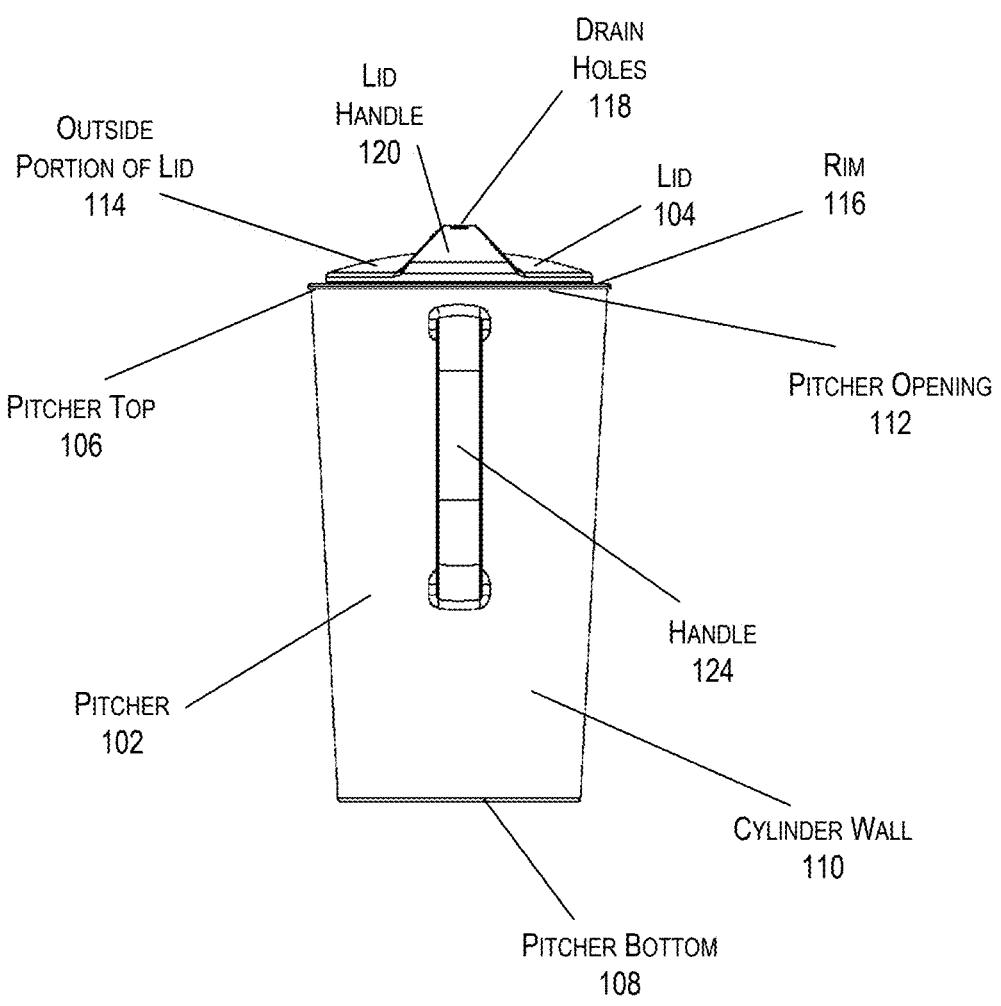
Figure 1F:
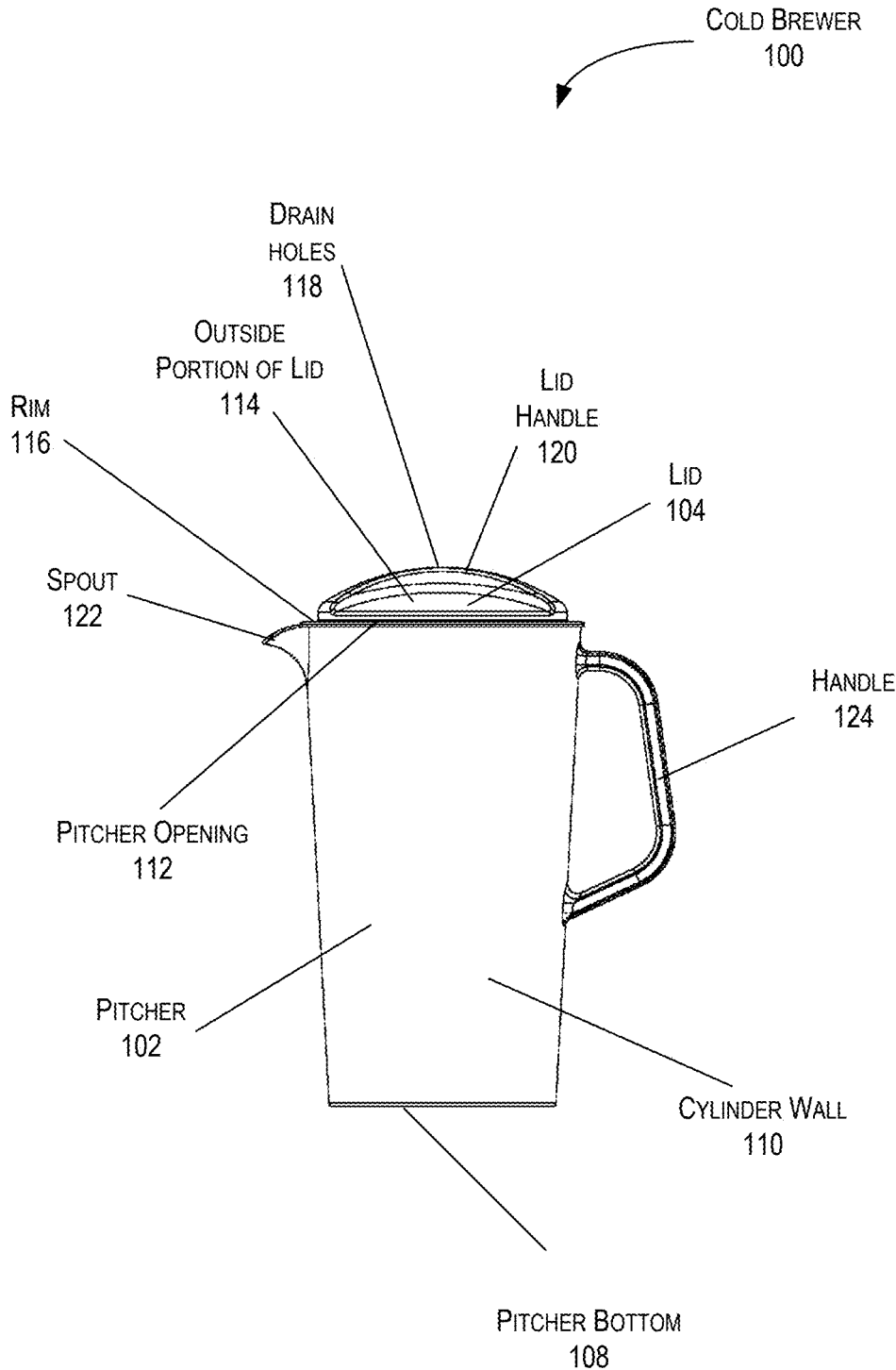
FIG. 1F is a side view of the cold brewer shown in FIGS. 1A through 1E in accordance with the present disclosure.

In FIG. 1B, a second isometric top view of the cold brewer 100 is shown in accordance with the present disclosure. FIGS. 1C and 1D are a top view and a front view of the cold brewer 100 and FIGS. 1E and 1F are a back view and a side view of the cold brewer 100. In this example, the cylindrical wall 110 may be approximately 250 millimeters in height.

It is appreciated by those of ordinary skill that cylindrical wall 110 of the pitcher 102 may be constructed of different materials that may include, for example, metal, plastic, ceramic, glass, or other similar materials, and may be opaque or transparent.

Figure 2A:
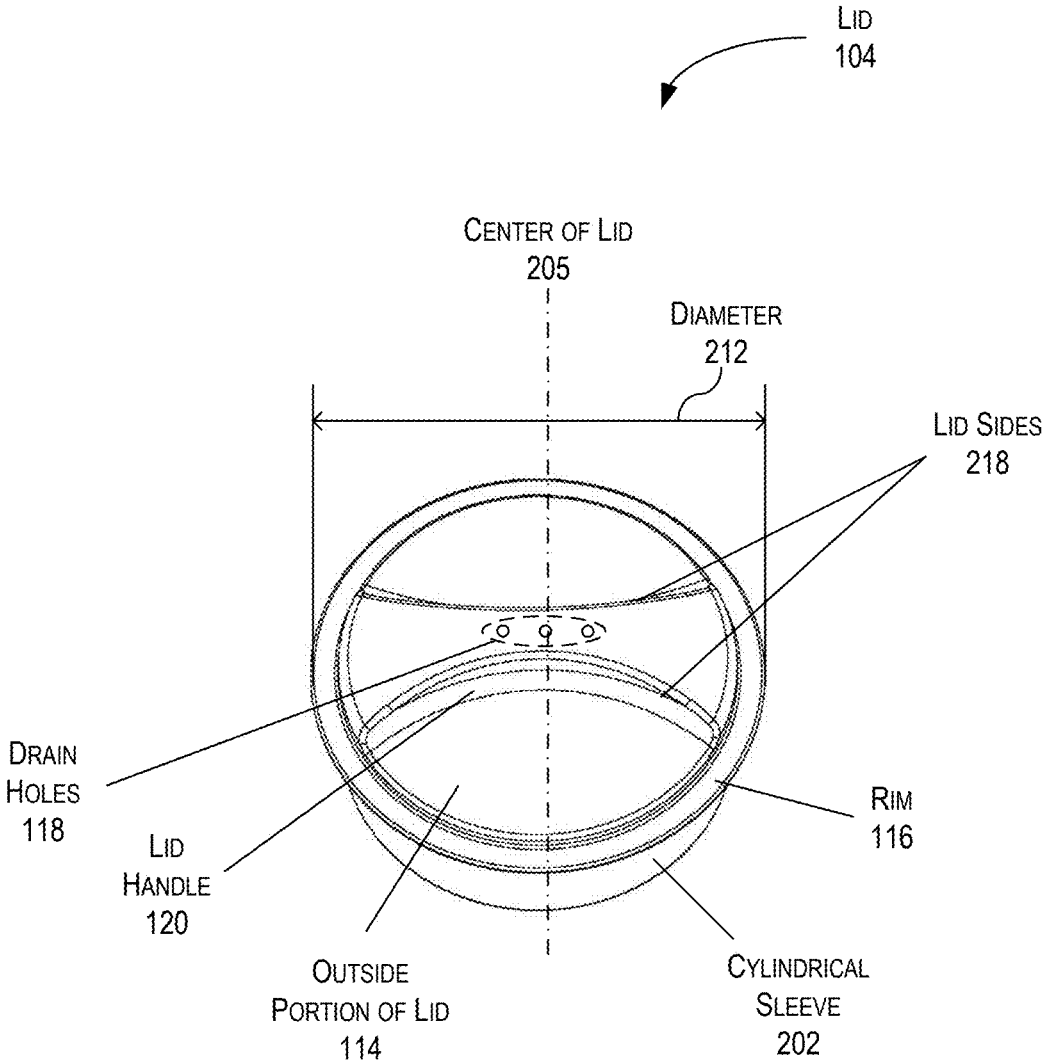
FIG. 2A is an isometric top view of an example of an implementation of the lid shown in FIGS. 1A through 1F in accordance with the present disclosure.
Figure 2B:
FIG. 2B is an isometric bottom view of the lid shown in FIGS. 1A through 1F and 2A in accordance with the present disclosure.
Figure 2B:
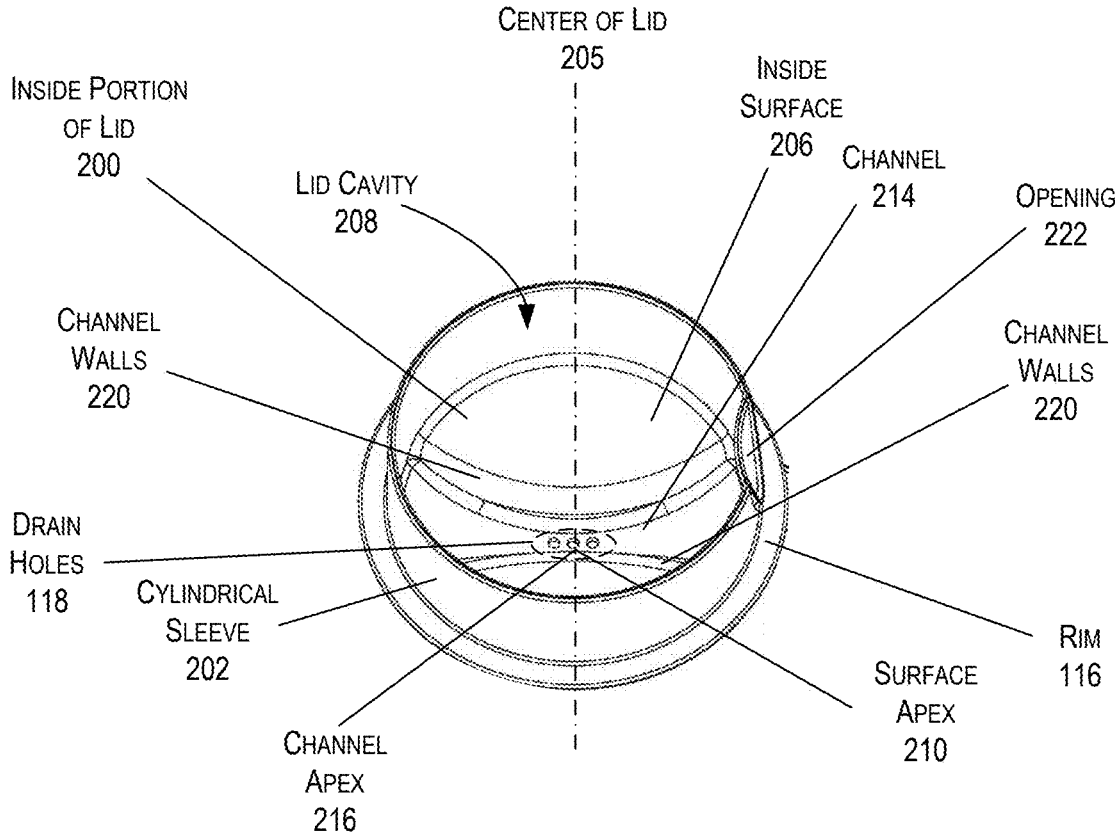

Turning to FIGS. 2A and 2B, FIG. 2A is an isometric top view of an example of an implementation of the lid 104 and FIG. 2B is an isometric bottom view of the lid 104 in accordance with the present disclosure. In this example, the lid 104 may include the outside portion 114, inside portion 200, the rim 116, and a cylindrical sleeve 202. In this example, the rim 116 is a lid ledge that extends radially from the center 205 of the lid 104 and is configured to rest on the edge 306 of the pitcher top 106.

The cylindrical sleeve 202 is a lid sleeve that extends outward from the inside surface 206 of the inside portion 200 of the lid 104. The cylindrical sleeve 202 in combination with the inside surface 206 of the inside portion 200 defines the lid cavity 208 within the inside portion 200 of the lid 104, where the lid cavity 208 is configured to receive the filter bag 400 within the lid cavity 208 when the filter bag 400 is removed from the pitcher cavity 300 and the outside portion 114 of the lid 104 is overturned (i.e., flipped over or turned over) and placed on the pitcher top 106.

In this example, the inside surface 206 of the inside portion 200 of the lid 104 may be a concave surface having a surface apex 210, where the one or more drain holes 118 are located at a position approximately at the surface apex 210. In this example, the concave surface is configured to drain the brewed effluent from the filter bag 400 into, and through, the one or more drain holes 118 into the pitcher cavity 300. In this example, the lid 104 may have a diameter 212 of approximately 120 millimeters. Moreover, the surface apex 210 may extend approximately 17 millimeters from the rim 116 of the lid 104. In this example, the lid 104 further includes a channel 214 within the concave surface of the inside surface 206 of the lid 104. The one or more holes 118 are located within a channel apex 216 and the channel 214 is configured as a curved surface that is curved downwardly towards the channel apex 216 so that the effluent drains towards the channel apex 216. In general, in this example, the channel apex 216 is located at the surface apex 210 within the channel 214.

As described earlier, the outside portion 114 of the lid 104 includes the lid handle 120 and the one or more holes 118. In this example, the lid handle 120 may be incorporated into the outside portion 114 of the lid 104 and includes lid sides 218 that correspond to channel walls 220 of the channel 214 within the concave surface of the inside surface 206 of the lid 104. In this example, the cylindrical sleeve 202 may include an opening 222 in the cylindrical sleeve 202 that corresponds to a position of the spout 122 on the pitcher 102, where the opening 222 in the cylindrical sleeve 202 is configured to allow the brewed effluent to be poured out of the pitcher cavity 300 through the opening 222 in the cylindrical sleeve 202 and the spout 122. In this example, the lid 104 is configured to be moveable along the top portion of the pitcher 102 (near the pitcher top 106) at the pitcher opening 112 such that the opening 222 in the cylindrical sleeve 202 may be moved from a first position adjacent to the pitcher inside wall 302 of the cylindrical wall 110 of the pitcher 102 to a second position adjacent to the spout 122 for pouring out the brewed effluent from the pitcher cavity 300.

Alternatively, the inside surface 206 may not have a channel 214 and the inside surface 206 may be an approximately smooth concave surface extending internally within the inside portion 200 of the lid 104 from the position of the rim 116 to the surface apex 210. Also alternatively, the one or more drain holes 118 may be a single drain hole where the single drain hole may have a diameter of approximately 23 millimeters. Moreover, the lid 104 may include a removeable lid handle 614 (not shown in this view) that includes a locking mechanism 640 that is configured to be removably inserted into the single drain hole through the outside portion 114 of the lid 104 and removably locked into the lid 104. In this example, the lid 104 may be constructed of different materials that may include, for example, rubber, metal, plastic, silicone, or other similar materials, and may be opaque or transparent.

Figure 3A:
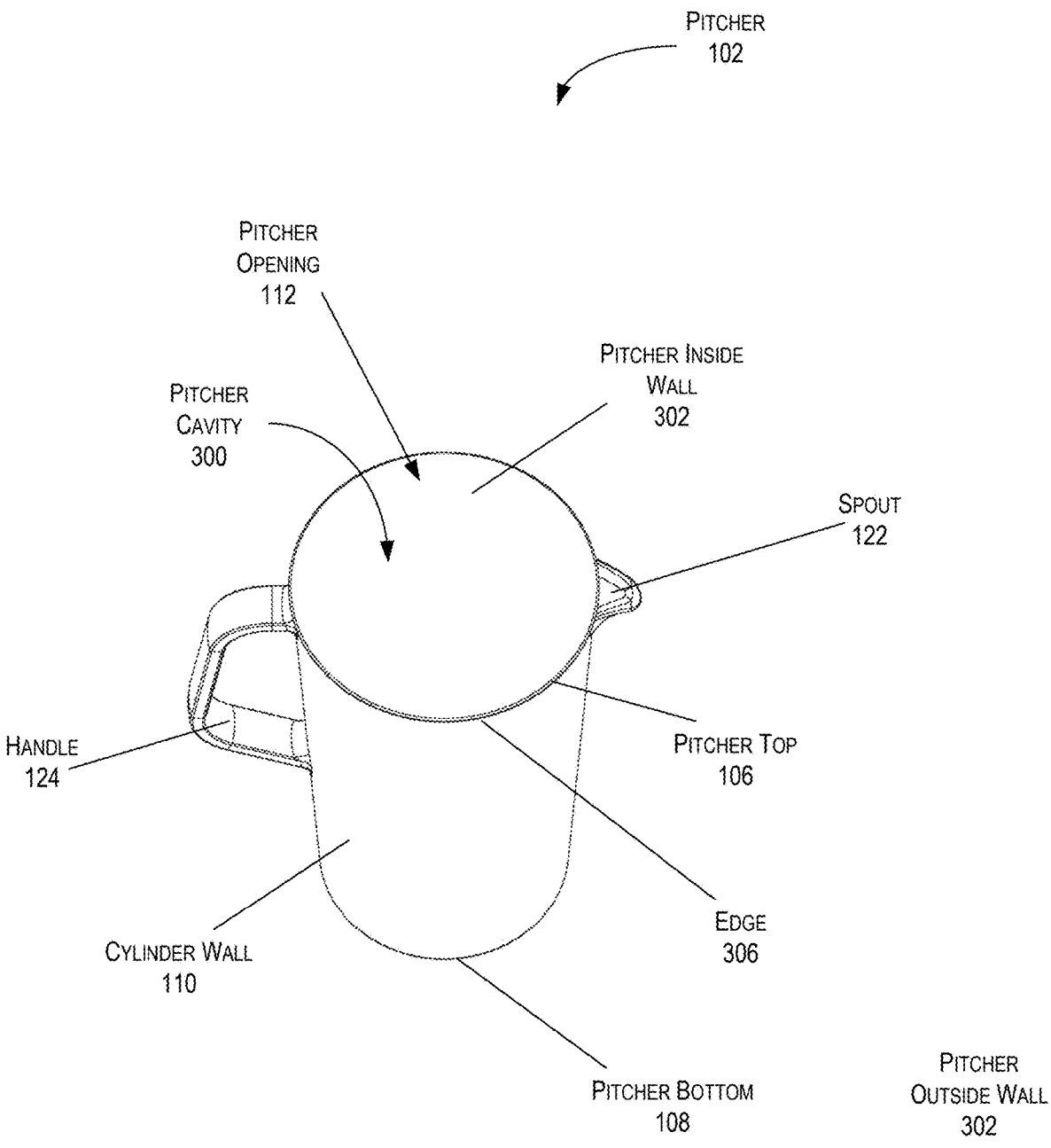
FIG. 3A is an isometric top view of an example of an implementation of the pitcher shown in FIGS. 1A through 1F in accordance with the present disclosure.
Figure 3B:
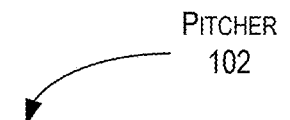
FIG. 3B is a top view of the pitcher shown in FIGS. 1A through 1F and 3A in accordance with the present disclosure.
Figure 3B:
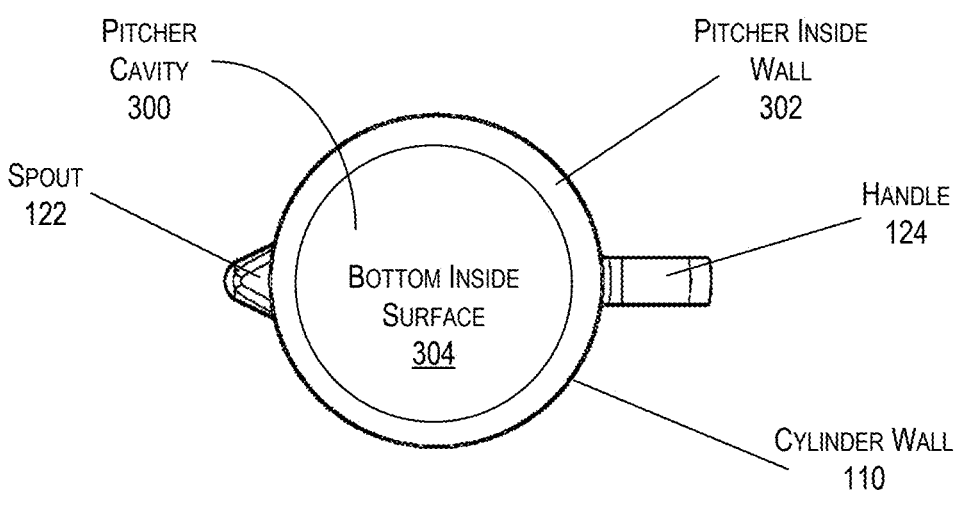

In FIG. 3A, an isometric top view of the pitcher 102 is shown in accordance with the present disclosure and in FIG. 3B, a top view of the pitcher 102 shown in accordance with the present disclosure. In this example, the pitcher 102 includes the spout 122, handle 124, pitcher top 106, and the pitcher cavity 300. As discussed earlier, the pitcher 102 includes the pitcher top 106 and the pitcher bottom 108. In this example, the pitcher 102 is generally cylindrical having the cylindrical wall 110 and the opening 112 at the pitcher top 106 that defines the pitcher cavity 300 within the pitcher 102. In this example, the cylindrical wall 110 is the outside wall of the pitcher 102. It is appreciated by those of ordinary skill in the art that while the outside wall of the pitcher 102 is described as generally cylindrical with the cylindrical wall 110 for the outside wall, the pitcher 102 may alternatively have other semi-conical or polyhedron shapes that are not cylindrical such as, for examples, a partial conical shape, a partial pyramid, a prism, tetrahedron, pentahedron, hexahedron, heptahedron, and so on. It is also appreciated by those of ordinary skill in the art that if the shape of the pitcher 102 changes, the shape of the lid 104 must also change to match the shape of the pitcher 102.

In this example of an approximately cylindrical pitcher 102, the pitcher cavity 300 is defined by the pitcher inside wall 302 of the cylindrical wall and a bottom inside surface 304 of the pitcher bottom 108, where the pitcher cavity 300 is configured to receive the filter bag 400 containing the organic material. The pitcher top 106 includes the edge 306 at the top of the cylindrical wall 110 of the pitcher 102. As discussed earlier, the cylindrical sleeve 202 and the outside portion 114 of the lid 104 are each configured to slide into the pitcher cavity 300 through the opening 112 at the pitcher top 106 until the rim 116 of the lid 104 sits on the edge 306 of the pitcher top 106. Moreover, when the lid 104 is overturned and the outside portion 114 of the lid 104 is placed on the top of the pitcher top 106, the edge 306 is also configured to allow the rim 116 of the lid 104 to sit on the edge 306 of the pitcher top 106. In this example, the handle 124 is configured to allow for easily holding the pitcher 102 and the spout 122 is configured to pour out the brewed effluent liquid when the brewing process is done. In this example, as discussed earlier, the pitcher 102 may have different suitable shapes that may vary from the example cylindrical shape shown in the figures.

Figure 4B:
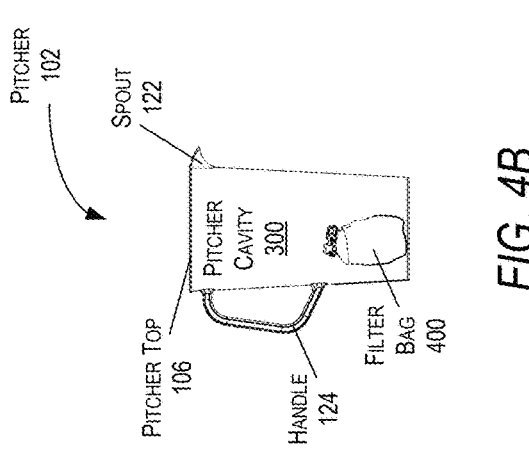
FIG. 4B is a side view of the cold brewer shown in FIGS. 1A through 1E and FIG. 4A with the filter bag within the pitcher in accordance with the present disclosure.
Figure 4D:
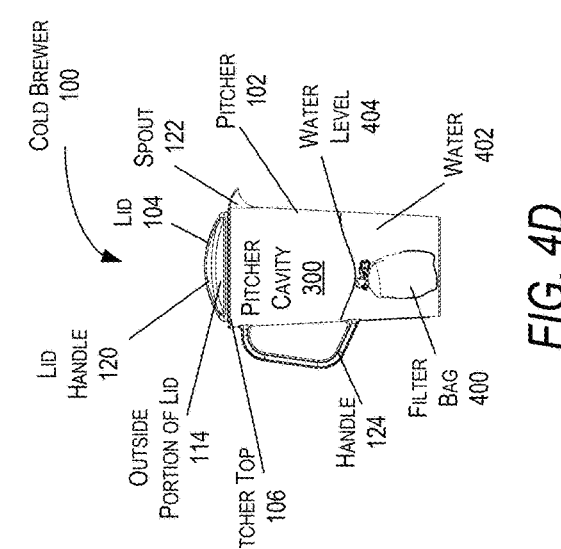
FIG. 4D is a side view of the cold brewer shown in FIGS. 1A through 1E and FIG. 4A through 4C with the filter bag and water within the pitcher and the lid placed on pitcher top in accordance with the present disclosure.
Figure 4A:
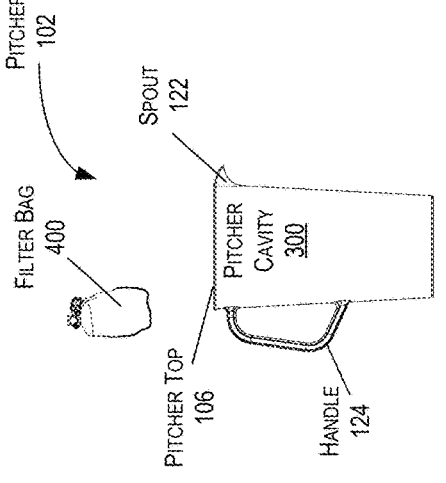
FIG. 4A is a side view of the cold brewer shown in FIGS. 1A through 1E receiving a filter bag full of organic material in accordance with the present disclosure.
Figure 4C:
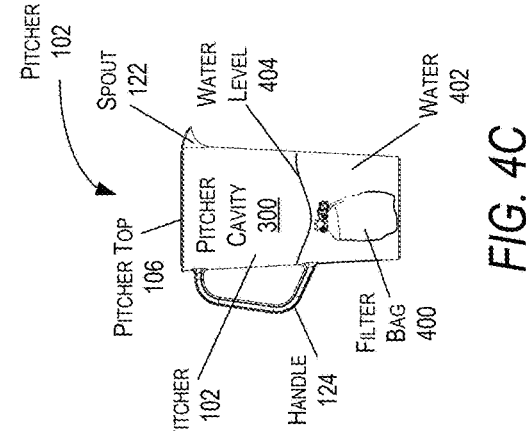
FIG. 4C is a side view of the cold brewer shown in FIGS. 1A through 1E and FIG. 4A through 4B with the filter bag and water within the pitcher in accordance with the present disclosure.
Figure 4F:
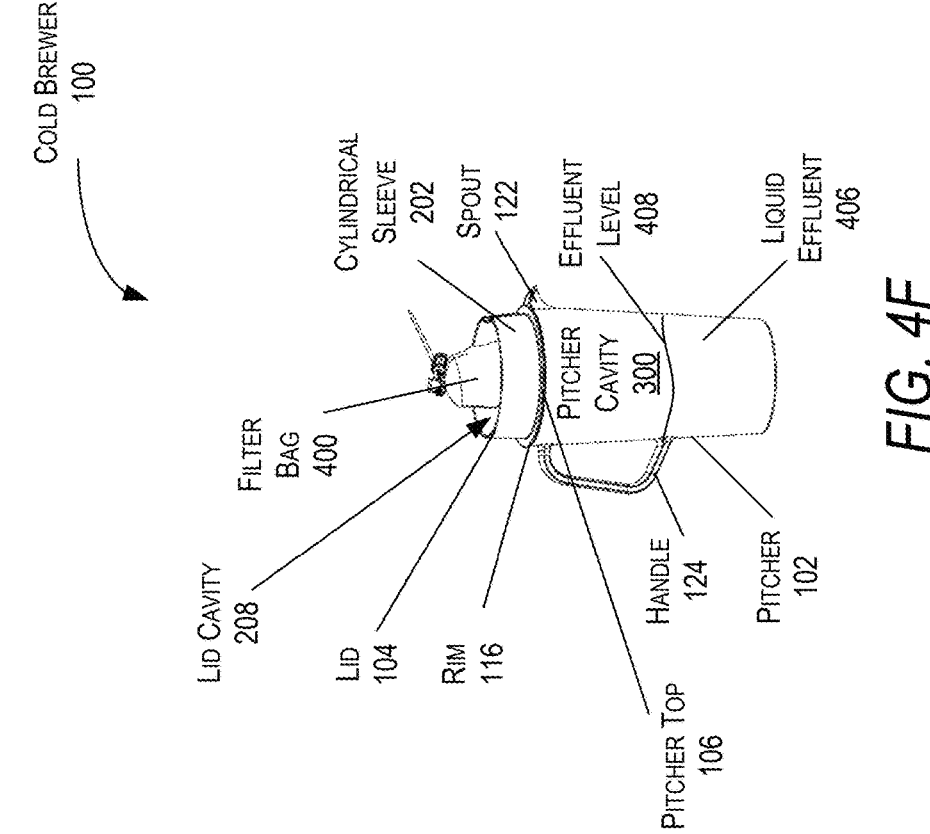
FIG. 4F is an isometric side view of the cold brewer shown in FIGS. 1A through 1E and FIG. 4A through 4E with the filter bag placed on the inside portion of the lid where the lid is placed on pitcher top in accordance with the present disclosure.
Figure 4E:
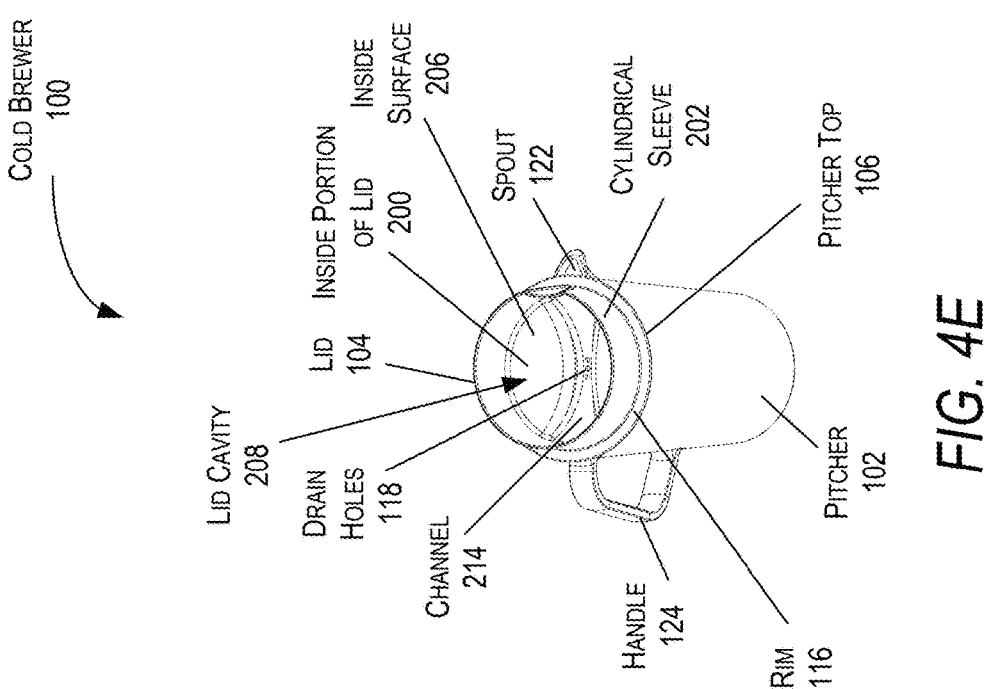
FIG. 4E is an isometric top view of the cold brewer shown in FIGS. 1A through 1E and FIG. 4A through 4D with the lid flipped and placed on pitcher top in accordance with the present disclosure.

FIG. 4A is a side view of the cold brewer 100, shown in FIGS. 1A through 1E, receiving a filter bag full 400 of organic material in accordance with the present disclosure. FIG. 4B is a side view of the cold brewer 100, shown in FIGS. 1A through 1E and FIG. 4A, with the filter bag 400 within the pitcher cavity 300 of the pitcher 102 in accordance with the present disclosure. FIG. 4C is a side view of the cold brewer 100, shown in FIGS. 1A through 1E and FIG. 4A through 4B, with the filter bag 400 and water 402 within the pitcher cavity 300 of the pitcher 102 in accordance with the present disclosure. FIG. 4D is a side view of the cold brewer 100, shown in FIGS. 1A through 1E and FIG. 4A through 4C, with the filter bag 400 and water 402 within the pitcher cavity 300 of the pitcher 102 and the lid 104 placed on the pitcher top 106 in accordance with the present disclosure. FIG. 4E is an isometric top view of the cold brewer 100, shown in FIGS. 1A through 1E and FIG. 4A through 4D, with the lid 104 overturned (i.e., flipped) and placed on pitcher top 106 in accordance with the present disclosure. FIG. 4F is an isometric side view of the cold brewer 100, shown in FIGS. 1A through 1E and FIG. 4A through 4E, with the filter bag 400 placed on the lid cavity 208 of the inside portion 200 of the lid 104, where the lid 104 is placed on pitcher top 106 in accordance with the present disclosure.

In these examples, the filter bag 400 is filed with organic material and sealed and the lid 104 is removed from the pitcher 102 in FIG. 4A. The filter bag 400 is then placed within the pitcher cavity 300 in FIG. 4B. It is appreciated by those of ordinary skill in the art that FIGS. 4A through 4F are not to scale so the size of the filter bag 400 relative to the cold brewer 100 may vary. The pitcher 102 is then filled with water 402 to a water level 404 above a top portion of the filter bag 400 in FIG. 4C. In another example, the water 402 may be placed in the pitcher 102 prior to the filter bag 400 being inserted into the pitcher 102. The lid 104 is then placed on the pitcher top 106 and the organic material in the filter bag 400 is cold brewed with the water 402 for a certain time to produce the effluent liquid within the pitcher cavity 300. In this example, the organic material may be coffee or tea and the certain time period may vary from an hour to over 24 hours based on the preferences of the end user of the cold brewer 100.

It is appreciated by those of ordinary skill in the art that while a filter bag 400 has been described in these examples, alternatively, a pre-filled sachet may be utilized instead of filter bag 400. In this example, the pre-filled sachet may be pre-filled with organic material such as, for example, tea or coffee.

Once the brewing process is complete (i.e., the organic material has been brewed for the certain time period), in FIG. 4E, the lid 104 and filter bag 400 are removed and the lid 104 is overturned (i.e., flipped over), and placed back on the pitcher top 106 in an inverted position where outside portion 114 of the lid 104 is placed within the pitcher cavity 300 and the inside portion 200 of the lid 104 is facing outward from the pitcher 102. In FIG. 4F, the filter bag 400 is placed within the lid cavity 208 of the inside portion 200 of the lid 104 and the effluent liquid drains from the filter bag 400 into the channel 214 and through the one or more drain holes 118 into the pitcher cavity 300 to the liquid effluent 406 increasing the level 408 of the liquid effluent 406.

Figure 5:
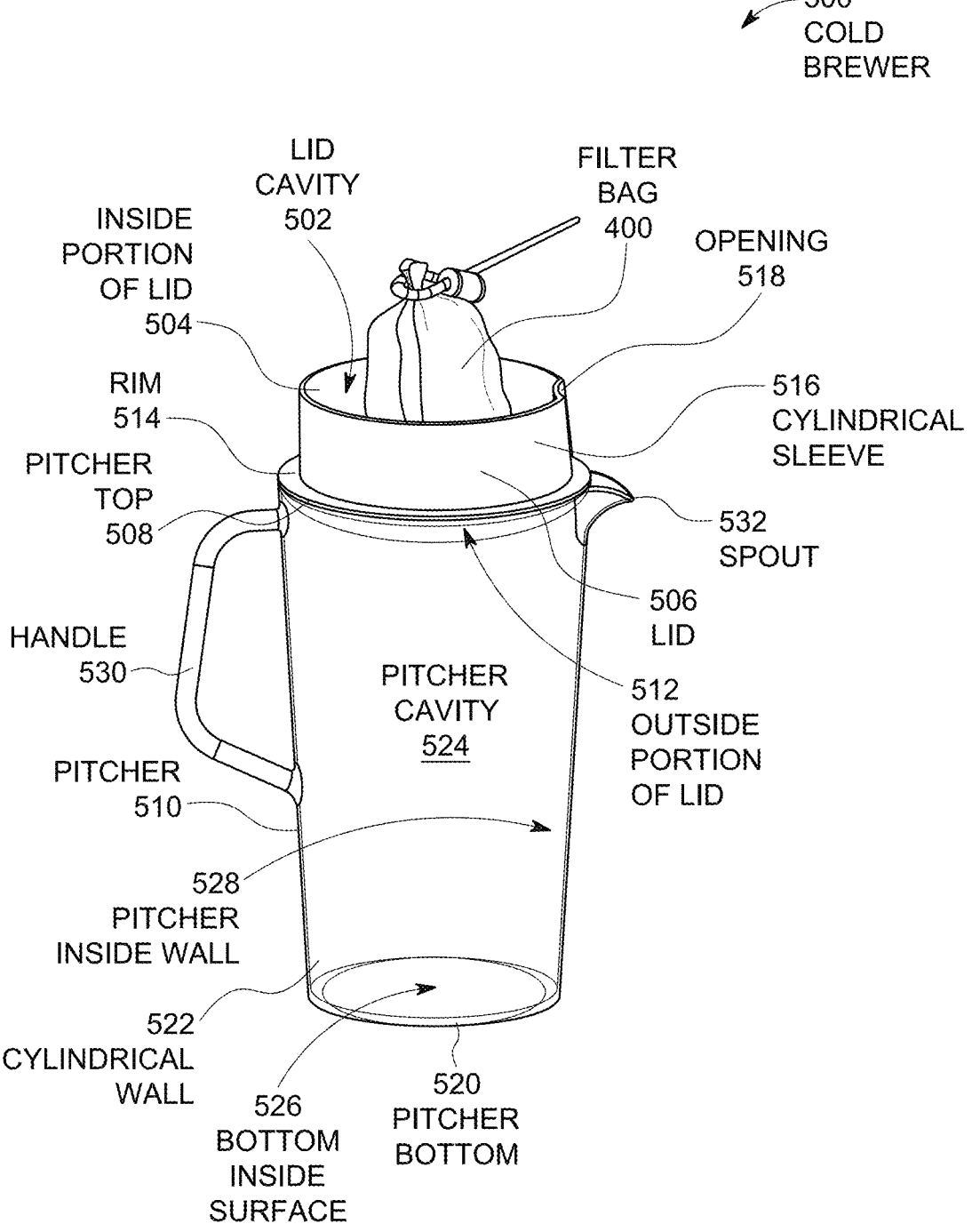
FIG. 5 is an isometric side view of an example of an implementation of the cold brewer shown in FIGS. 1A through 1E and FIG. 4A through 4F with the filter bag placed on the inside portion of the lid where the lid is placed on pitcher top and the pitcher is constructed of transparent material in accordance with the present disclosure.

FIG. 5 is an isometric side view of another cold brewer 500 with the filter bag 400 placed within a lid cavity 502 of the inside portion 504 of the lid 506, where the lid 506 is placed on pitcher top 508 of the pitcher 510. Similar to the previous examples, in this example, the lid 506 includes the outside portion 512 of the lid 506, rim 514, cylindrical sleeve 516, inside portion 504 of the lid 506, and lid cavity 502 with the inside portion 504 of the lid 506 within the cylindrical sleeve 516 of the lid 506. The lid 506 may also include the opening 518 within the cylindrical sleeve 516.

Similarly, the pitcher 510 includes the pitcher top 508, pitcher bottom 520, cylindrical wall 522, pitcher cavity 524, bottom inside surface 526, pitcher inside wall 528, pitcher handle 530, and spout 532. In this example, the pitcher 510 is constructed of a transparent material such as, for example, clear plastic or glass and the lid 506 is constructed of an opaque material such as, for example, rubber, opaque plastic, ceramic, opaque glass, or metal.

Figure 6A:
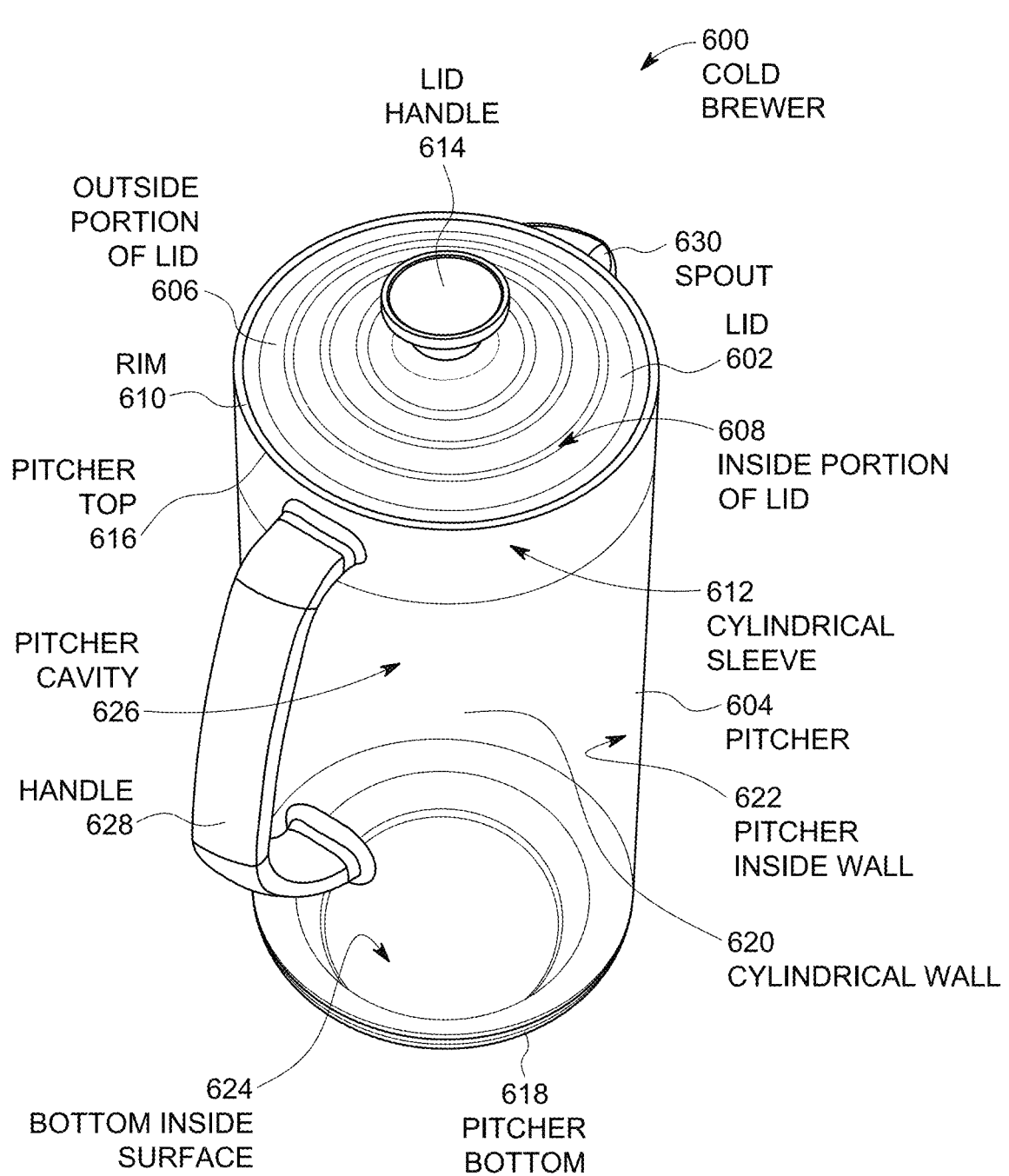
FIG. 6A is an isometric top view of an example of another implementation of the cold brewer in accordance with the present disclosure.
Figure 6B:
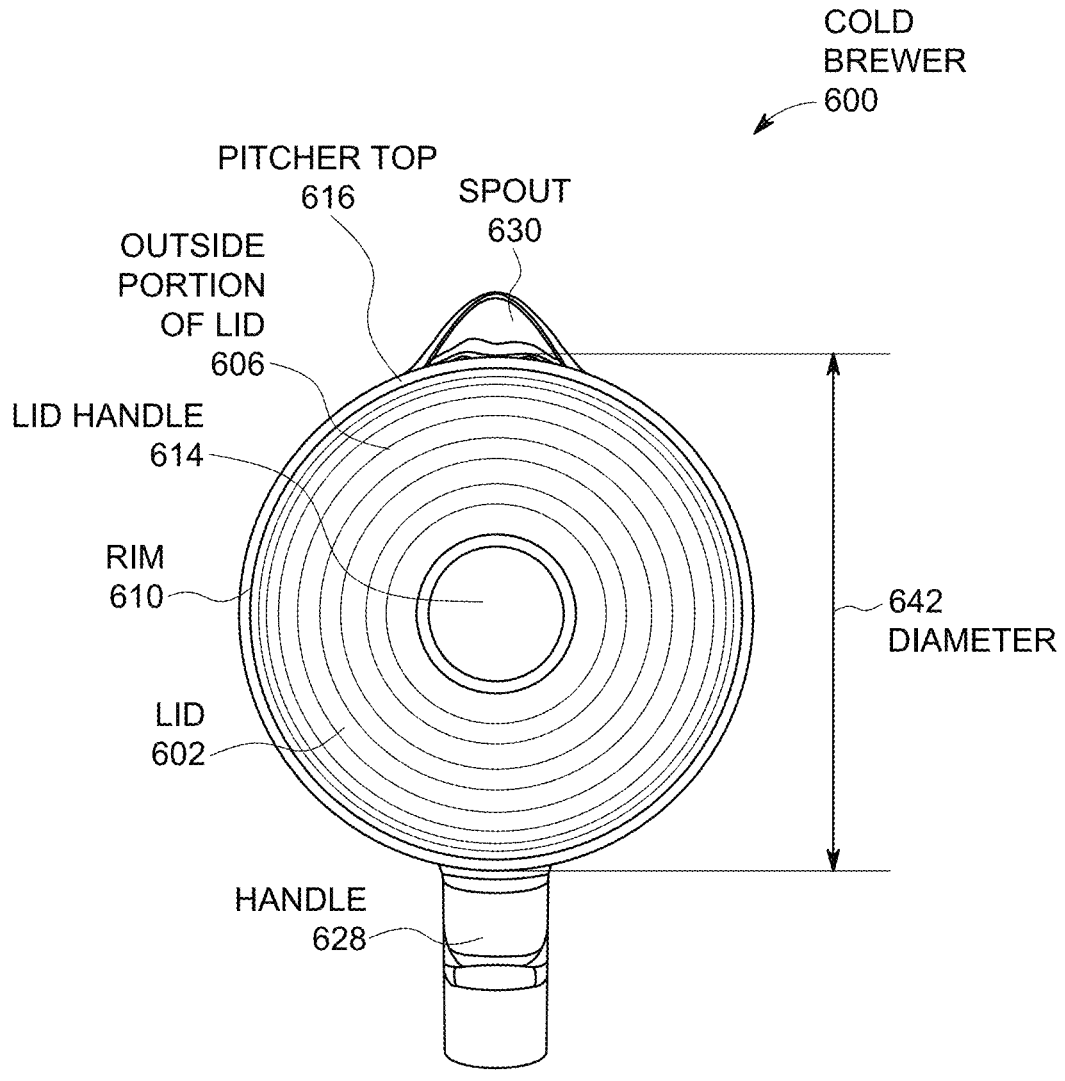
FIG. 6B is a top view of the cold brewer shown in FIG. 6A in accordance with the present disclosure.
Figure 6C:
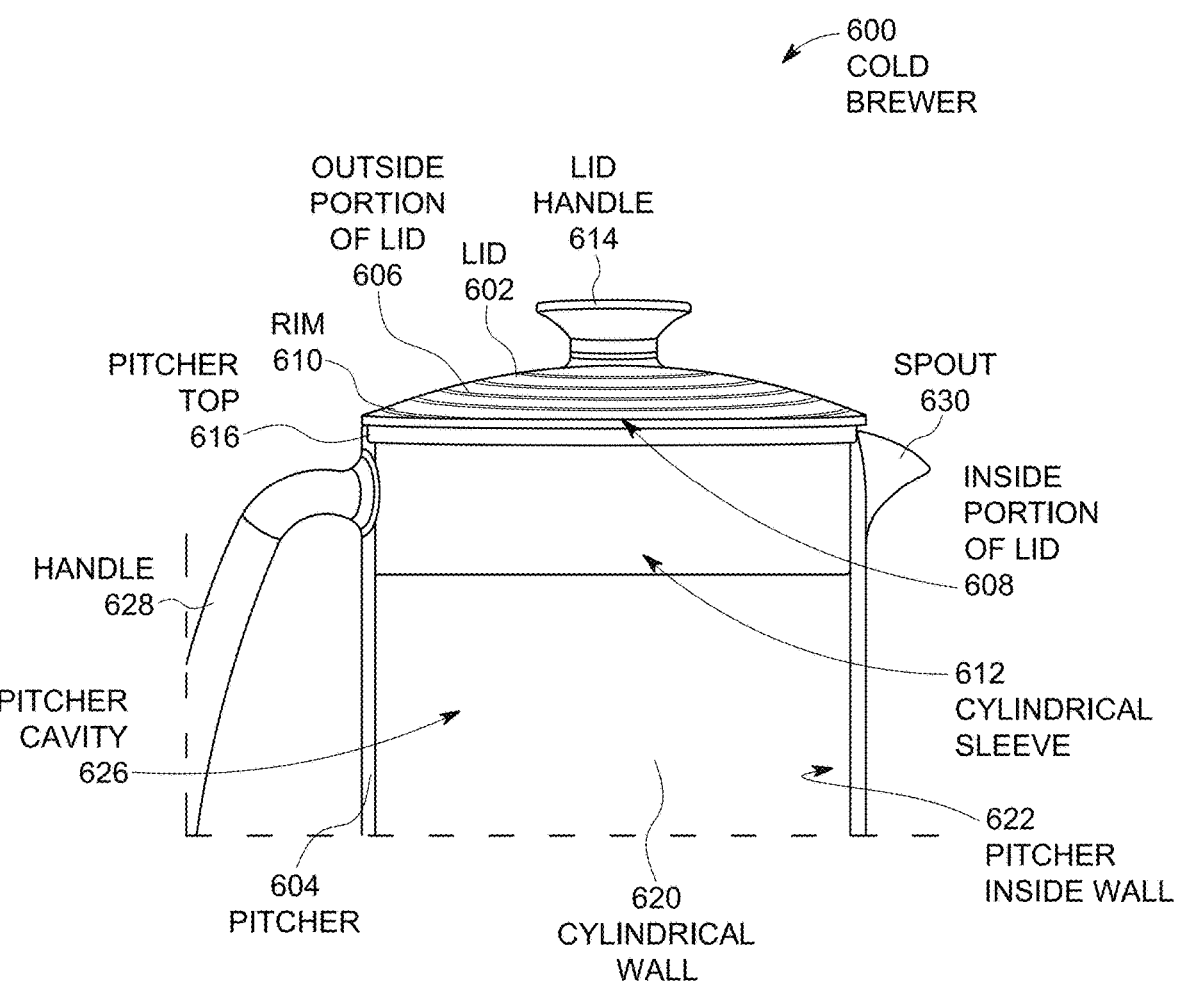
FIG. 6C is a close-up side view of the cold brewer shown in FIGS. 6A and 6B in accordance with the present disclosure.
Figure 6D:
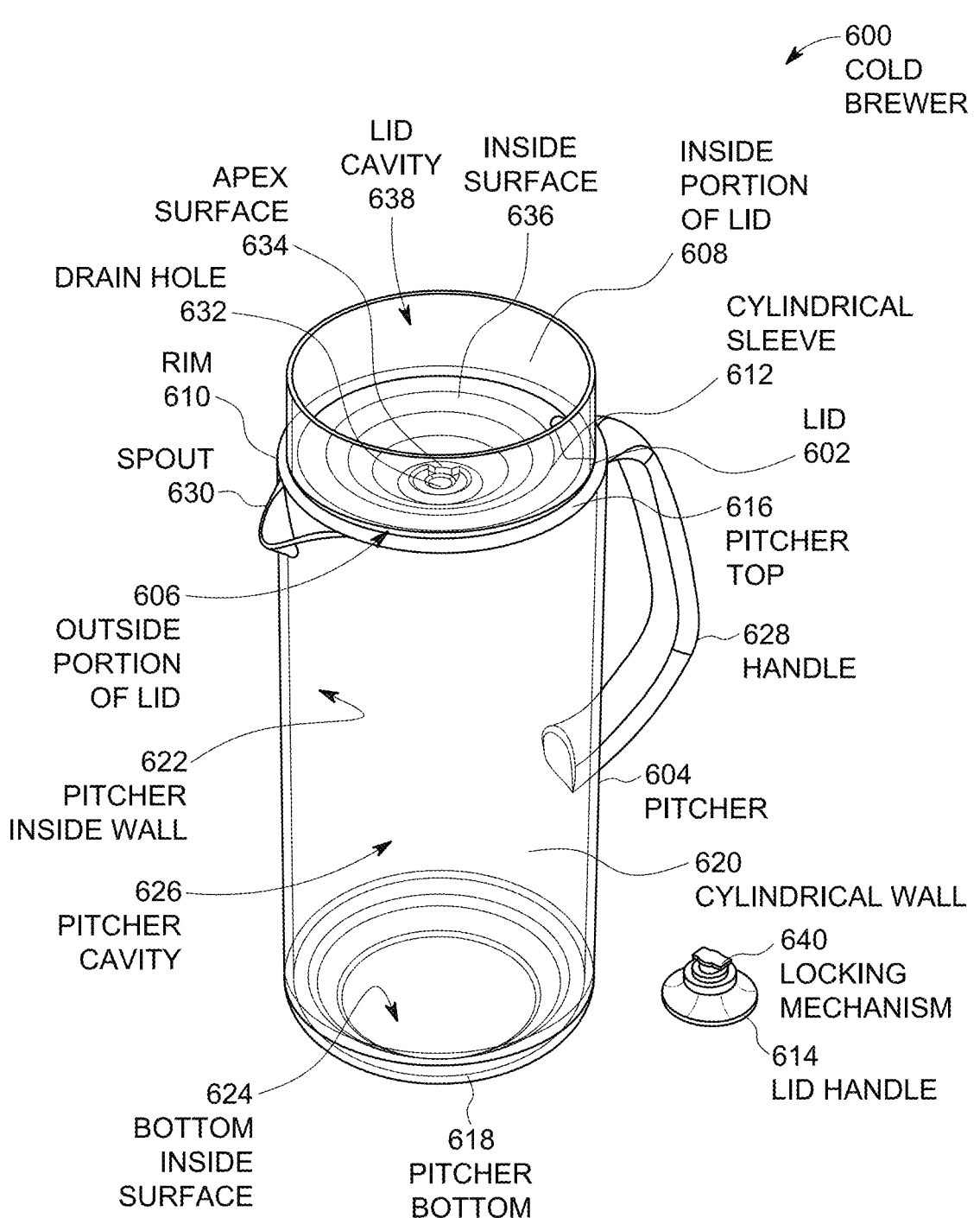
FIG. 6D is another isometric top view of the cold brewer, shown in FIGS. 6A-6C, with an overturned lid in accordance with the present disclosure.

Turning to FIG. 6A, an isometric top view of an example of another implementation of the cold brewer 600 is in accordance with the present disclosure. FIG. 6B is a top view of the cold brewer 600, shown in FIG. 6A, in accordance with the present disclosure and FIG. 6C is a close-up side view of the cold brewer 600, shown in FIGS. 6A and 6B, in accordance with the present disclosure. FIG. 6D is another isometric top view of the cold brewer 600, shown in FIGS. 6A-6C, with an overturned lid 602 in accordance with the present disclosure.

In this example, similar to the previous examples, the cold brewer 600 includes the lid 602 and the pitcher 604. The lid 602 includes an outside portion 606 of the lid 602, inside portion 608 of the lid 602, rim 610, cylindrical sleeve 612, and a lid handle 614. Similarly, the pitcher 604 includes the pitcher top 616, pitcher bottom 618, cylindrical wall 620, pitcher inside wall 622, bottom side surface 624, pitcher cavity 626, handle 628, and spout 630. In this example, the lid 602 includes a single drain hole 632 at the apex surface 634 of the inside surface 636 of the lid 602. The lid cavity 638 is also within the inside portion 608 of the lid 602. Furthermore, the lid handle 614 may be a removeable lid handle having a locking mechanism 640 that is configured to be removably inserted into the single drain hole 632 through the outside portion 606 of the lid 602. In this example, the single drain hole 632 may have a diameter of approximately 23 millimeters. Moreover, the lid 602 may have a diameter 642 of approximately 120 millimeters and the surface apex 634 may extend approximately 17 millimeters from the rim 610 of the lid 602. The cylindrical sleeve 612 may have a height of approximately 35 millimeters and the pitcher 604 may have a height of approximately 250 millimeters.

Figure 7:
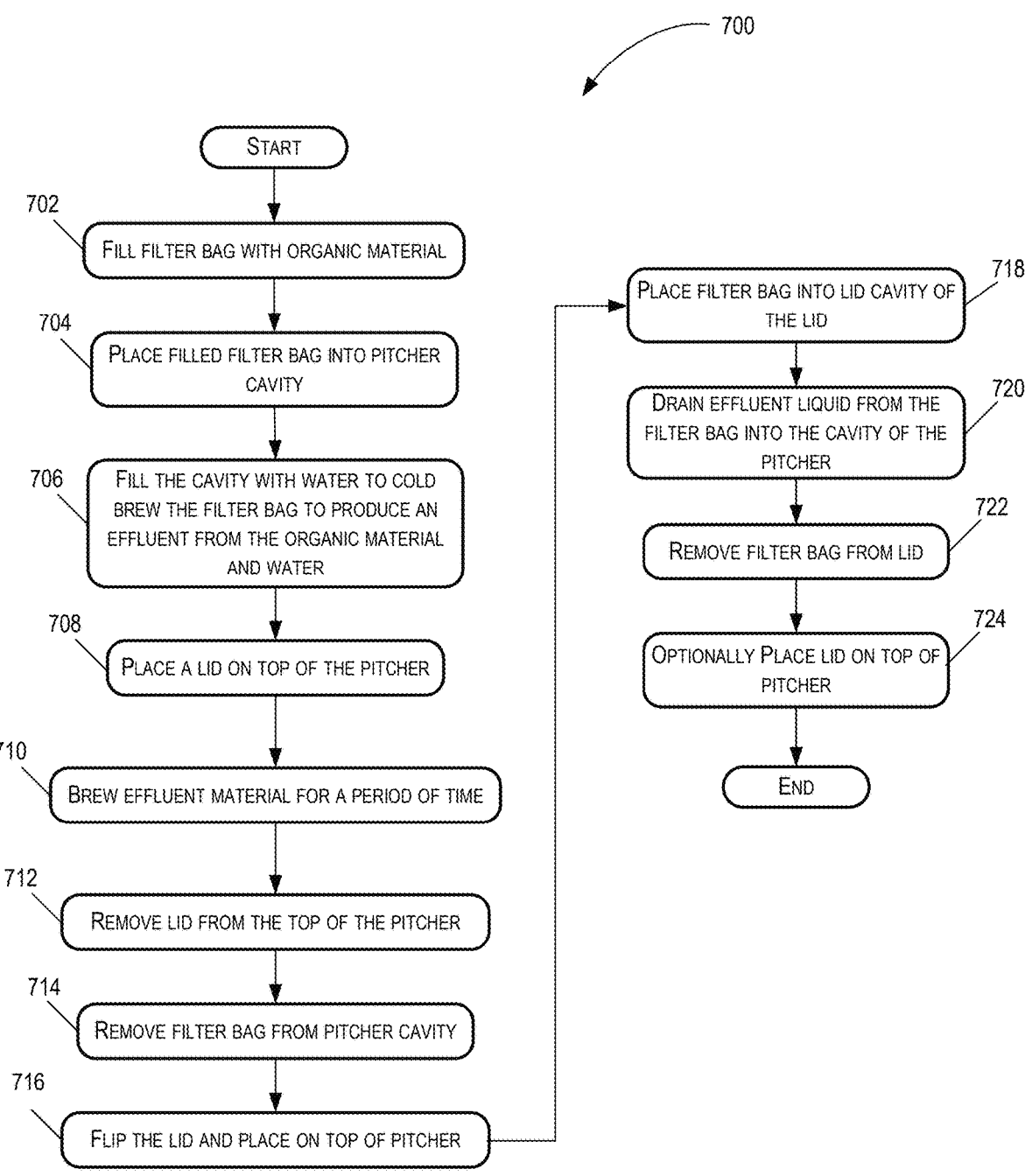
FIG. 7 is a flowchart of a method performed by the cold brewer shown in FIGS. 1A through 6D in accordance with the present disclosure.

Turning to FIG. 7, a flowchart of a method 700 is shown performed by the cold brewer 100, 500, or 600 in accordance with the present disclosure. The method 700 starts by filling 702 the filter bag 400 with the organic material; placing 704 the filter bag 400 within the pitcher cavity 300, 524, or 626 of the pitcher 102, 510, or 604 of the cold brewer 100, 500, or 600; filling 706 the pitcher cavity 300, 524, or 626 with water; placing 708 the lid 104, 506, or 602 on the top of the pitcher (i.e., pitcher top 106, 508, or 616), where the lid 104, 506, or 602 has the one or more drain holes 118 or 632, the outside portion 114, 512, or 606, and the inside portion 200, 504, or 608 and where the inside portion 200, 504, or 608 of the lid 104, 506, or 602 rests on the pitcher top 106, 508, or 616 with the rim 116, 514, or 610; cold brewing 710 a brewed effluent from the filter bag 400 containing the organic material; removing 712 the lid 104, 506, or 602 from the pitcher top 106, 508, or 616; removing 714 the filter bag 400 from the pitcher cavity 300, 524, or 626; overturning 716 (i.e., flipping) the lid 104, 506, or 602 such that the outside portion 114, 512, or 606 of the lid 104, 506, or 602 rests on the pitcher top 106, 508, or 616 at the edge 306 of the pitcher 102; placing 718 the filter bag 400 within the lid cavity 208, 502, or 638 of the inside portion 200, 504, or 608 of the lid 104, 506, or 602; draining 720 the brewed liquid effluent 406 from the filter bag 400 into the pitcher cavity 300, 524, or 626 through the one or more drain holes 118 or 632; removing 722 the filter bag 400 from the lid 104, 506, or 602; and optionally flipping and placing 724 the lid 104, 506, or 602 back on the pitcher top 106, 508, or 616. The method 700 then ends.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Furthermore, the description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

It will also be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

In some alternative examples of implementations, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different examples of implementations has been presented for purposes of illustration and description, and is not intended to be exhaustive or limited to the examples in the form disclosed. Many modifications and variations will be apparent to those of ordinary skill in the art. Further, different examples of implementations may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A cold brewer for brewing a brewed effluent from a filter bag containing an organic material, the cold brewer comprising:
    a pitcher having a pitcher top and a pitcher bottom, wherein
        the pitcher is cylindrical having a cylindrical wall and an opening at the pitcher top that defines a pitcher cavity within the pitcher,
        the pitcher cavity is defined by a pitcher inside wall of the cylindrical wall and a bottom inside surface of the pitcher bottom, and
        the pitcher cavity configured to receive the filter bag containing the organic material; and
    a lid configured to cover the pitcher top, wherein the lid includes
        an outside portion,
        an inside portion,

10 a rim that extends radially from a center of the lid,
        a cylindrical sleeve that extends outward from the inside portion of the lid and with an inside surface of the inside portion defines a lid cavity within the inside portion of the lid, wherein
            the inside surface of the inside portion of the lid is a concave surface having a surface apex,
            the one or more drain holes are located at a position at the surface apex,
            the concave surface is configured to drain the brewed effluent from the filter bag into, and through, the one or more drain holes into the pitcher cavity, and
            the lid further comprises a channel within the concave surface of the inside surface of the lid,
        wherein the lid cavity is configured to receive the filter bag within the lid cavity when the filter bag is removed from the pitcher cavity and the outside portion is overturned and placed on the pitcher top, and
        one or more drain holes that pass through the outside portion to the inside portion of the lid,
    wherein
        the cylindrical sleeve and the outside portion of the lid are each configured to slide into the pitcher cavity through the opening at the pitcher top until the rim sits on an edge of the pitcher top, and
    the one or more drain holes are configured to drain the brewed effluent from the filter bag into the pitcher cavity when the filter bag is in a resting position within the lid cavity.

2. The cold brewer of claim 1, wherein the cylindrical sleeve extends outward from the inside portion of the lid 35 millimeters.

3. The cold brewer of claim 1, wherein the cylindrical wall of the pitcher is 250 millimeters in height.

4. The cold brewer of claim 1, wherein the one or more drain holes includes a single hole having a diameter of 23 millimeters.

5. The cold brewer of claim 1, wherein the lid has a diameter of 120 millimeters and the surface apex extends 17 millimeters from the rim of the lid.

6. The cold brewer of claim 1, wherein
    the one or more holes are located within a channel apex,
    the channel is configured as a curved surface that is curved downwardly towards the channel apex so that the effluent drains towards the channel apex, and
    the channel apex is located at the surface apex.

7. The cold brewer of claim 6, further comprising a lid handle, wherein the lid handle is incorporated into the outside portion of the lid and includes lid sides that correspond to channel walls of the channel within the concave surface of the inside surface of the lid.

8. The cold brewer of claim 1, further comprising a removeable lid handle, wherein
    the one or more drain holes includes a single drain hole, and
    the removeable lid handle includes a locking mechanism that is configured to be removably inserted into the single drain hole through the outside portion of the lid and removably locked into the lid.

9. The cold brewer of claim 1, wherein the pitcher further includes a spout at the pitcher top.

10. The cold brewer of claim 9, wherein the cylindrical sleeve includes an opening in the cylindrical sleeve that corresponds to a position of the spout, wherein the opening in the cylindrical sleeve is configured to allow the brewed effluent to be poured out of the pitcher cavity through the opening in the cylindrical sleeve and the spout.

11. The cold brewer of claim 10, wherein the lid is configured to be moveable along the pitcher top such that the opening in the cylindrical sleeve may be moved from a first position adjacent to the pitcher inside wall of the cylindrical wall of the pitcher to a second position adjacent to the spout for pouring out the brewed effluent.

12. The cold brewer of claim 1, further including a pitcher handle attached to an outside surface of the cylindrical wall of the pitcher.

13. The cold brewer of claim 1, wherein the pitcher and the lid are constructed of a material selected from the group consisting of metal, ceramic, plastic, glass, and rubber.

14. The cold brewer of claim 13, wherein the material is transparent.

15. A method for cold brewing an organic material in a cold brewer having a pitcher and a lid, the method includes:

filling a filter bag with the organic material; inserting the filter bag within a pitcher cavity of the pitcher; inserting water within the pitcher cavity, wherein inserting the water includes inserting a quantity of water into the pitcher cavity that covers the filter bag;

placing the lid on a top of the pitcher, wherein the lid includes an outside portion, an inside portion, a rim that extends radially from a center of the lid, and the rim sits on an edge of the top of the pitcher;

cold brewing a brewed effluent from the organic material within the filter bag;

removing the lid from the top of the pitcher;

removing the filter bag from the pitcher cavity;

overturning and placing the outside portion of the lid on the top of the pitcher, wherein the lid further includes a cylindrical sleeve that extends outward from the inside portion of the lid and with an inside surface of the inside portion defines a lid cavity within the inside portion of the lid, wherein the inside surface of the inside portion of the lid is a concave surface having a surface apex, the one or more drain holes are located at a position at the surface apex, and the concave surface is configured to drain the brewed effluent from the filter bag into, and through, the one or more drain holes into the pitcher cavity, wherein flowing the effluent along the concave surface includes flowing the effluent along a channel within the concave surface of the inside surface of the lid, wherein the lid cavity is configured to receive the filter bag within the lid cavity when the outside portion is overturned and placed on the top of the pitcher and one or more drain holes that pass through the outside portion to the inside portion of the lid;

placing the filter bag within the lid cavity; and draining the brewed effluent from the filter bag into the pitcher cavity through the one or more drain holes.

16. The method of claim 15, wherein flowing the effluent along the concave surface includes flowing the effluent along a channel within the concave surface of the inside surface of the lid, and wherein the one or more holes are located within a channel apex, the channel is configured as a curved surface that is curved downwardly towards the channel apex so that the effluent drains towards the channel apex, and the channel apex is located at the surface apex.

17. The method of claim 16, wherein overturning and placing the outside portion of the lid on the top of the pitcher includes removing a removeable lid handle from the outside portion of the lid, wherein the one or more drain holes includes a single drain hole, and the removeable lid handle includes a locking mechanism that is configured to be removably inserted into the single drain hole through the outside portion of the lid and locked into the lid.

18. The method of claim 16, further including pouring out the brewed effluent from the pitcher cavity with a spout at the top of the pitcher top.

* * * * *